United States Patent [19]

Whyte et al.

[11] 4,142,178

[45] Feb. 27, 1979

[54] HIGH VOLTAGE SIGNAL COUPLER FOR A DISTRIBUTION NETWORK POWER LINE CARRIER COMMUNICATION SYSTEM

[75] Inventors: Ian A. Whyte, Churchill Borough; Stephen R. Swanson, Penn Hills, both of Pa.

[73] Assignee: Westinghouse Electric Corp., Pittsburgh, Pa.

[21] Appl. No.: 790,228

[22] Filed: Apr. 25, 1977

[51] Int. Cl.² .................................................. H04B 3/56
[52] U.S. Cl. ................................. 340/310 R; 307/149; 333/70 S; 336/175
[58] Field of Search ............... 340/310 R, 310 A, 151; 333/24 C, 70 S, 70 CR; 307/3, 149; 336/175

[56] References Cited

U.S. PATENT DOCUMENTS

| | | | |
|---|---|---|---|
| 1,699,806 | 1/1929 | Oppenheimer | 340/310 R |
| 2,294,735 | 9/1942 | Du Mont | 340/310 R |
| 3,924,223 | 12/1975 | Whyte et al. | 340/310 R |
| 4,016,429 | 4/1977 | Vercellotti et al. | 340/310 R |

Primary Examiner—John W. Caldwell, Sr.
Assistant Examiner—James J. Groody
Attorney, Agent, or Firm—D. R. Lackey

[57] ABSTRACT

A high voltage signal coupler couples carrier communication signals between a distribution network primary conductor and communication elements located at spaced intervals on the distribution network. A single bushing, high frequency, coupling capacitor communicates the carrier communication signals between one of the distribution network primary conductors and a conductor which is at ground or real earth potential with respect to power current frequencies. A parallel resonant circuit, formed by a tuning capacitor and a hollow core of magnetic material inductively surrounding the power frequency ground conductor, couples the carrier communication signals to the communication elements connected thereto at a predetermined frequency without interfering with the operation of the ground conductor at the frequency of the power current.

5 Claims, 5 Drawing Figures

HIGH VOLTAGE SIGNAL COUPLER FOR A DISTRIBUTION NETWORK POWER LINE CARRIER COMMUNICATION SYSTEM

BACKGROUND OF THE INVENTION

1. Field of the Invention

This invention relates in general to power line carrier communication systems and, more specifically, to signal couplers for use in such communication systems.

2. Description of the Prior Art

Power line carrier communications have been carried over high voltage transmission lines between the power generating site and the power transmission switching site or distribution substation site for many years. The recent increase in the desirability of performing certain distribution functions, such as automatic reading of utility meters, selective load control, and the like, has made it desirable to use the distribution power line conductors for the transmission of communication signals. However, the use of the distribution network conductors for the transmission of carrier communication signals presents many problems not encountered in high voltage transmission line communication systems. Some of these problems include the poor high frequency impedance characteristics and the high level of electrical noise present on the distribution network conductors which, along with the plurality of distribution transformers and power factor correction capacitors attached to the distribution network, rapidly attenuate the communication signals.

In general, a distribution network communication system includes a central communication terminal which transmits a frequency modulated interrogation signal to a remote communication terminal, usually located at a customer premise. The remote communication terminal, on receiving the interrogation signal, performs the desired automation function and sends a response signal containing the automation function data back to the central communication terminal.

Many different distribution network communication systems have been developed to transmit communication signals between the central communication terminal and the remote communication terminal. U.S. Pat. No. 3,702,460, issued to J. Blose, and patent application Ser. No. 649,774, filed Jan. 16, 1976, in the name of L. Vercellotti, now U.S. Pat. No. 4,016,429, and assigned to the assignee of the present invention, disclose a distribution network communication system which utilizes the grounded neutral conductor of the distribution network for signal communication. The central communication terminal and the remote communiation terminals are disposed in signal communication with the grounded neutral conductor of the distribution network by signal couplers comprised of a hollow magnetic core surrounding the neutral conductor to form a single turn primary winding configuration. Furthermore, capacitive elements placed in parallel relationship with the ferritic core form a parallel resonant circuit at the frequency of the communication signals. Signal repeaters are coupled to the neutral conductor by similar means at spaced intervals along the distribution network in order to amplify and improve the signal to noise ratio of the communication signal.

Another type of distribution network communication system is disclosed in U.S. Pat. No. 3,911,415, issued to I. Whyte, and assigned to the assignee of the present invention, wherein the primary and secondary conductors of the distribution network are utilized as a signal transmission path. In this type of communication system, signal repeaters, in addition to amplifying the communication signal, are used at each distribution transformer location to transfer the communication signal between the primary and secondary conductors and thereby bypass the transformer which is the primary source of signal attenuation in the distribution network. Since the signal repeaters in this type of communication system are coupled to the high voltage primary conductors, a high voltage signal coupler is required. The high voltage signal couplers utilized in prior art communication systems of this type, are typically comprised of a high voltage coupling capacitor and a drain coil or matching transformer; wherein the coupling capacitor connects the signal repeater to the high voltage primary conductor of the distribution network and the drain coil or matching transformer provides impedance matching for the receiver and transmitter sections of the signal repeater. The most common type of coupling capacitor used in prior art communication systems includes two bushings which electrically isolate the high and low voltage terminals of the capacitor from the capacitor housing. One of the bushings connects the high voltage capacitor terminal to the primary conductor, while the other bushing connects the low voltage terminal to the drain coil or matching transformer. The drain coil or matching transformer is in turn connected to ground via a ground conductor which is mounted on each utility pole or vertical support and connects the neutral conductor of the distribution network to real or earth ground.

While this type of signal coupler provides satisfactory signal coupling, various portions of the circuit can rise to the voltage of the primary conductor if the ground connection is broken. For example, the normally low voltage terminal of the capacitor can rise to the potential of the primary conductor if the drain coil or matching transformer becomes disconnected from ground or if its winding becomes open-circuited. Furthermore, the normally grounded terminal of the drain coil or matching transformer can rise to the voltage of the primary conductor if the terminal is removed or disconnected from real ground. Also, the use of twin bushing capacitors is also quite expensive and in distribution systems above 10 kV become almost impossible to obtain. Less expensive single bushing capacitors, in which the low voltage terminal of the capacitor is connected to the capacitor housing have also been used in the past. However, single bushing capacitors cannot be used in some distribution networks in which the utility company requires that the ground conductor must be able to be seen by the linemen to be continuous and unbroken. Since all capacitor cases are considered to be at real ground potential, the single bushing capacitor cannot be utilized in prior art signal couplers which connect the capacitor to the drain coil instead of to ground. Thus, it becomes desirable to provide a signal coupler for use in a communication system utilizing the high voltage primary conductors of a distribution network for the transmission of carrier communication signals in which the less expensive single bushing coupling capacitor can be utilized, the signal coupler can be easily installed in existing distribution networks and the ground connection can easily be observed to be continuous.

SUMMARY OF THE INVENTION

Herein disclosed is a novel, high voltage signal coupler suitable for coupling high frequency carrier communications signals between a high voltage distribution network primary conductor and communication elements such as signal reconditioning repeaters and remote communication terminals located at spaced intervals on the distribution network. The high voltage signal coupler utilizes a single bushing capacitor wherein the high voltage capacitor terminal is connected via an insulating bushing in the distribution network primary conductor and the low voltage capacitor terminal is connected to the conductive capacitor housing which is in turn connected to a ground conductor carried by an upright vertical support. The coupling capacitor provides a high impedance to the 60 Hz. power current to minimize the power frequency current drain through it; while at the same time provides a low impedance to the high frequency carrier communications signals thereby allowing the carrier signal to pass freely through the coupling capacitor to the ground conductor. A transformer-type coupler comprised of a hollow, core of magnetic material inductively surrounds the ground conductor to form a single turn, primary winding configuration. Secondary windings, inductively coupled to the magnetic core, are connected to the receiver and transmitter portions of the repeater in impedance matched relationship. A tuning capacitor is coupled in parallel with the core to form a parallel resonant circuit at the carrier communications signal frequency which provides a low impedance at the 60 Hz. frequency of the power current, thereby allowing the ground conductor to function properly at the power current frequency; while at the same time providing a high impedance to the high frequency carrier communications signal which causes the carrier communications signal to be developed across the parallel resonant circuit. In one embodiment of this invention, additional parallel resonant circuits, tuned to the frequency of the carrier communications signal and comprised of hollow, magnetic cores arranged in parallel with a tuning capacitor, are inductively coupled around the distribution network neutral conductor, where such a pole to pole grounded conductor is used, on either side of the ground conductor to block the carrier communications signal from ground connections on adjacent utility poles.

This novel high voltage signal coupler reduces the possibility of exposed high voltage potential since the disconnection of any part of the coupler circuit from ground will not cause the remainder of the circuit to rise to the potential of the primary distribution conductors. In addition, the characteristics of the magnetic cores are such that they will saturate at large currents and thereby offer negligible impedance which causes little or no voltage drop to be developed across the ferritic cores during high current fault conditions such as lightning strikes. The disclosed signal coupler further enables the less expensive single bushing coupling capacitor to be used in utility company distribution networks which require every portion of the ground conductor and the grounded neutual conductor to be easily viewed by the utility lineman to ensure continuity and proper connection.

BRIEF DESCRIPTION OF THE DRAWINGS

The various features, advantages and other uses of this invention will become more apparent by referring to the following detailed description and drawings, in which.

DESCRIPTION OF THE PREFERRED EMBODIMENTS

Throughout the following description, similar reference numbers refer to similar components in all figures of the drawing.

Figure 1:
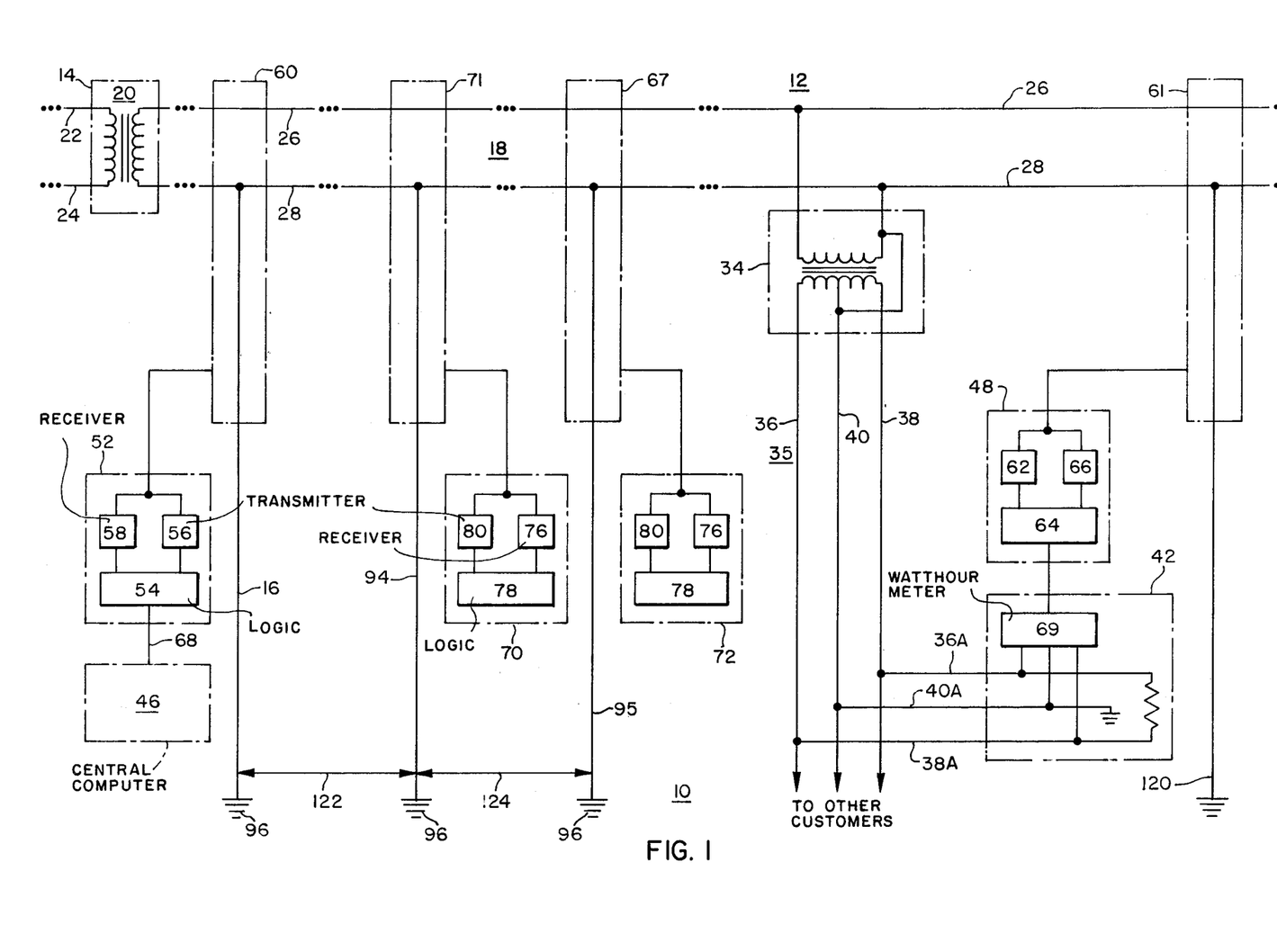
FIG. 1 is a block and schematic diagram of a distribution network power line carrier communication system.

Referring now to the drawing, and to FIG. 1 in particular, there is shown a distribution network power line communication system 10. The distribution network communication system 10 utilizes the primary conductors of a power distribution network 12 to transmit high frequency communication signals between a central communication terminal and a plurality of remote communication terminals. By way of introduction, the general arrangement of the distribution network 12 will be described for a better understanding of the invention.

By way of example and not by limitation, the distribution network 12 is provided by an electric utility company to distribute alternating electrical power, typically in the order of 60 Hz., from a substation 14 to electric loads at multiple customer premises. Only one substation 14, one set of primary and secondary distribution lines and one remote electrical load are presented; it being understood that an actual distribution network could include several substations, many branches of primary and secondary distribution lines and several thousand remote customer loads. The substation 14 includes a step-down transformer 20 which receives high voltage electrical power from a generating site (not shown) through conductors 22 and 24. The secondary of the substation transformer 20 provides power at moderate voltage levels to the distribution network primary conductors 18 which link the substation 14 with a plurality of distribution transformers. The distribution network primary conductors 18 include first and second conductors 26 and 28, respectively, which form a single phase, two-wire system; it being understood that a three-phase, four-wire distribution system could be utilized as well. According to standard electrical utility wiring practice, one of the distribution network primary conductors, such as conductor 28, is grounded at the substation 14, such as at location 16, and also at multiple points along the distribution network 12, by ground conductors carried on utility poles, such as ground conductors 94 and 95 and 120. At various intervals along the distribution network 12, distribution transformers, such as transformer 34, are connected to the distribution network primary conductors 26 and 28 to transform the moderate voltage power carried on conductors 26 and 28 to the low voltage power used by the remote electrical loads. The secondary of distribution transformer 34 is connected to a secondary distribution network 35, typically comprised of two ungrounded conductors, such as conductors 36 and 38 for transformer 34, and one grounded conductor, such as conductor 40, which form a three-wire, single-phase system which delivers low voltage electrical power to a group of customer premises. Secondary service conductors 36A, 38A and 40A conduct the low voltage power from the secondary conductors 36, 38 and 40 to the customer premises 42. The grounded secondary conductor 40 is in turn connected to the grounded neutral primary conductor 28 at transformer 34 to form a continuous, pole-to-pole, grounded neutral conductor throughout the distribution network 12.

The distribution network carrier communications system associated with the above-described distribution network 12 will now be described. The communications system is generally comprised of a central communication terminal 52 typically associated with a substation, such as substation 14, and remote communication terminals located at each customer premise, such as terminal 48 located at customer premise 42. These terminals may be of the type disclosed in U.S. Pat. No. 3,911,415, issued to I. Whyte, and assigned to the assignee of the present invention. In accordance with the afore-mentioned patent, the central communication terminal 52 includes a logic circuit 54, an interrogation signal transmitter 56, a response signal receiver 58 and a signal coupler 60. Correspondingly, each remote communication terminal, such as terminal 48, contains a coupler 61, an interrogation signal receiver 62, a logic circuit 64, and a response signal transmitter 66. The central communication terminal 52 is linked to a computer 46 by a communication link 68 which can include either radio or standard telephone lines. The remote communications terminal 48, in turn, may be associated with meter reading or load control apparatus at the customer premise, such as the watthour meter 69 at customer premise 42.

According to the communications system described in U.S. Pat. No. 3,911,415, the central communications terminal 52 is arranged to transmit and receive carrier communications signals which are of the frequency-shift-key modulated type in which two frequencies represent binary states of logic which correspond to information signals handled in the logic circuit of each terminal. These communication signals are coupled to the primary distribution conductor 26 via signal coupler 60, described in greater detail below, for transmission to the remote customer terminal 48; at which point they are coupled by signal coupler 61 to the receiver 62, logic 64 and transmitter 66 circuitry of terminal 48. Response signals from the remote customer terminal 48 are retransmitted via the same primary distribution conductor 26 to the central terminal 52 and thereon to the computer 46. It is also contemplated that the response signals may be coupled to the grounded secondary neutral conductor 40, wherein they are transmitted through transformer 34 to primary conductor 26 and thence to the central terminal 52.

Figure 2:
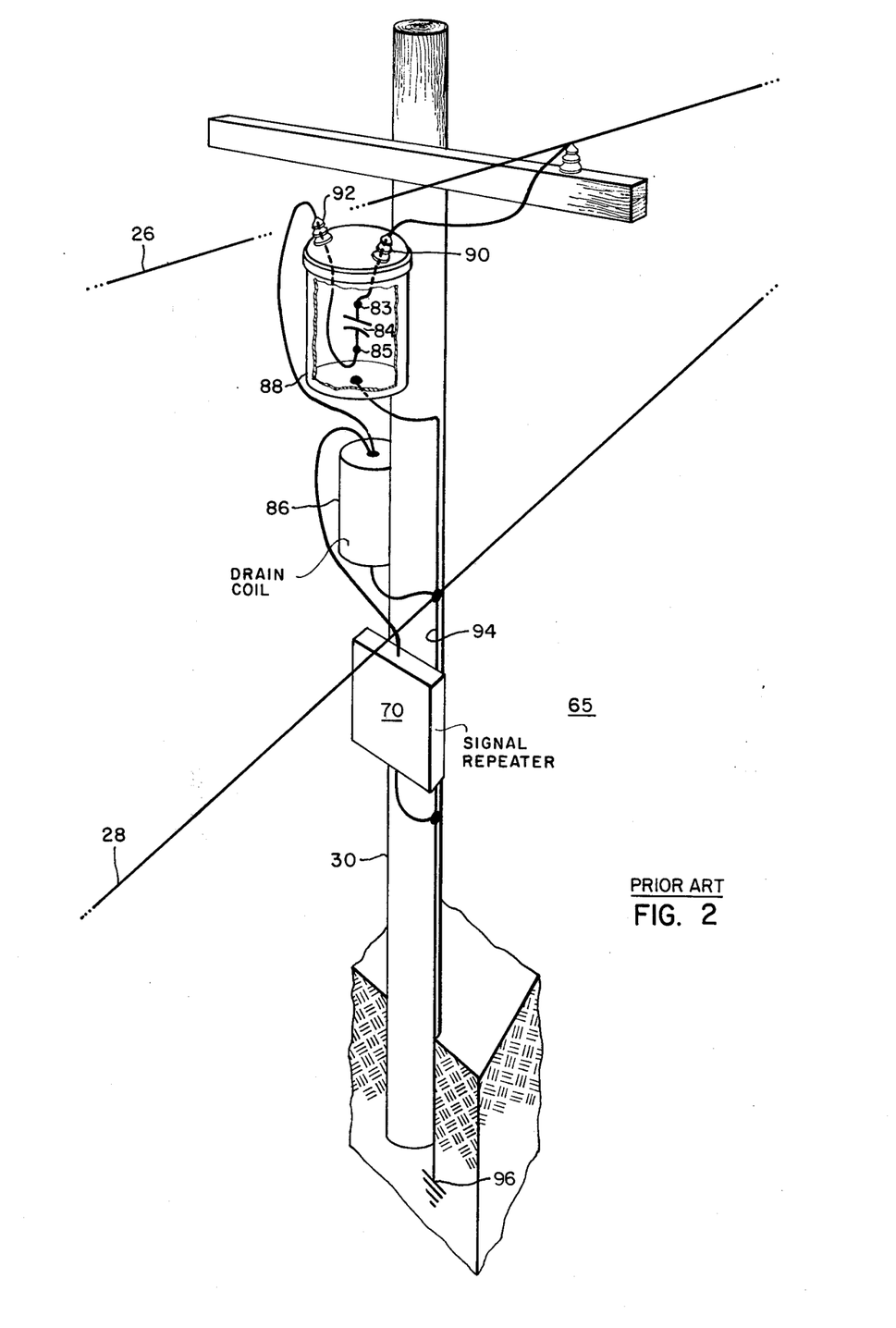
FIG. 2 is a diagrammatic and schematic view of a typical prior art high voltage signal coupler used in distribution network power line carrier communication systems.

In actual practice, the distance between remote communication terminal 48 and the central communication terminal 52 can be considerable. It is known that distribution network conductors, such as conductors 26 and 28, possess poor high frequency impedance characteristics and high electrical noise susceptibility; which factors greatly attenuate the high frequency carrier communication signals traveling thereon. In order to insure that the carrier communication signal generated at the central communication terminal 52 is received at remote terminal 48 in a useable form, signal repeaters, such as repeaters 70 and 72, are coupled to the distribution network primary conductors at spaced intervals along the distribution network 12. The signal repeaters 70 and 72 recondition and amplify the carrier communication signal such that it is sufficient to reach either the adjacent repeater or the selected remote communication terminal. In addition, signal repeaters may be used to connect directly to the remote communication terminal and thereby bypass the distribution transformer, which is the primary source of carrier signal attenuation. Since each repeater is similarly constructed, only repeater 70 will be described in detail below. According to U.S. Pat. No. 3,911,415, repeater 70 is comprised of a receiver 76, a logic circuit 78 and a transmitter 80. As shown more clearly in FIG. 2, repeater 70 is typically mounted on a vertical upright support or utility pole 30 and coupled to the primary conductor 26 by signal coupler 65. The signal coupler 65, shown in FIG. 2, is a prior art type of coupler and is comprised of a high voltage coupling capacitor 84 and a drain coil or matching transformer 86, both mounted on utility pole 30. According to common utility practice, the high voltage coupling capacitor 84 has high and low voltage terminals, 83 and 85 which are connected to the high voltage primary conductor 26 and the drain coil 86, respectively. The capacitor element 84 is mounted in a conductive case or housing 88 which supports two electrical insulating bushings 90 and 92 which isolate the capacitor connections from the case 88. The housing 88 is connected to a ground conductor 94 carried on the utility pole 30 which connects the capacitor case 88 and the pole-to-pole primary neutral conductor 28 to real earth ground 96. The drain coil or matching transformer 86 is also connected to the ground conductor 94 on the utility pole 30 and provides coupling and impedance matching for the repeater 70.

Although signal coupler 65 efficiently couples the carrier communication signals between the primary distribution conductor 26 and the repeater 70, various portions of its circuit can rise to the high voltage potential of the primary conductor if the ground connection is broken. For example, the normally low voltage terminal 85 of the coupling capacitor 84 can rise to the voltage of the primary distribution conductor 26 if the drain coil 86 becomes disconnected from ground 96 or develops an open circuit in its coil. Furthermore, the terminal connecting the drain coil 86 to earth ground 96 can rise to the voltage of the primary distribution conductor 26 if it becomes disconnected from ground 96.

A different type of capacitor, frequently used in the distribution networks, has only a single bushing instead of the two bushing version shown in FIG. 2. The single bushing capacitor contains a high voltage bushing, similar to bushing 90, which isolates the high voltage terminal of the capacitor 84 from the housing 88. The low voltage terminal of the capacitor is in turn connected to the capacitor case 88 which is isolated from real ground 96 and the neutral conductor 28 and is connected to the drain coil or matching transformer 86 in a manner similar to that shown in FIG. 2. Although the use of a single bushing capacitor provides a slight cost advantage, it cannot be used in those utility company distribution networks which require that the ground connection be easily observed to be continuous and unbroken. In such a distribution network, the capacitor housing must be at ground potential, thereby preventing its connection to the drain coil as in prior art signal couplers.

Figure 3:
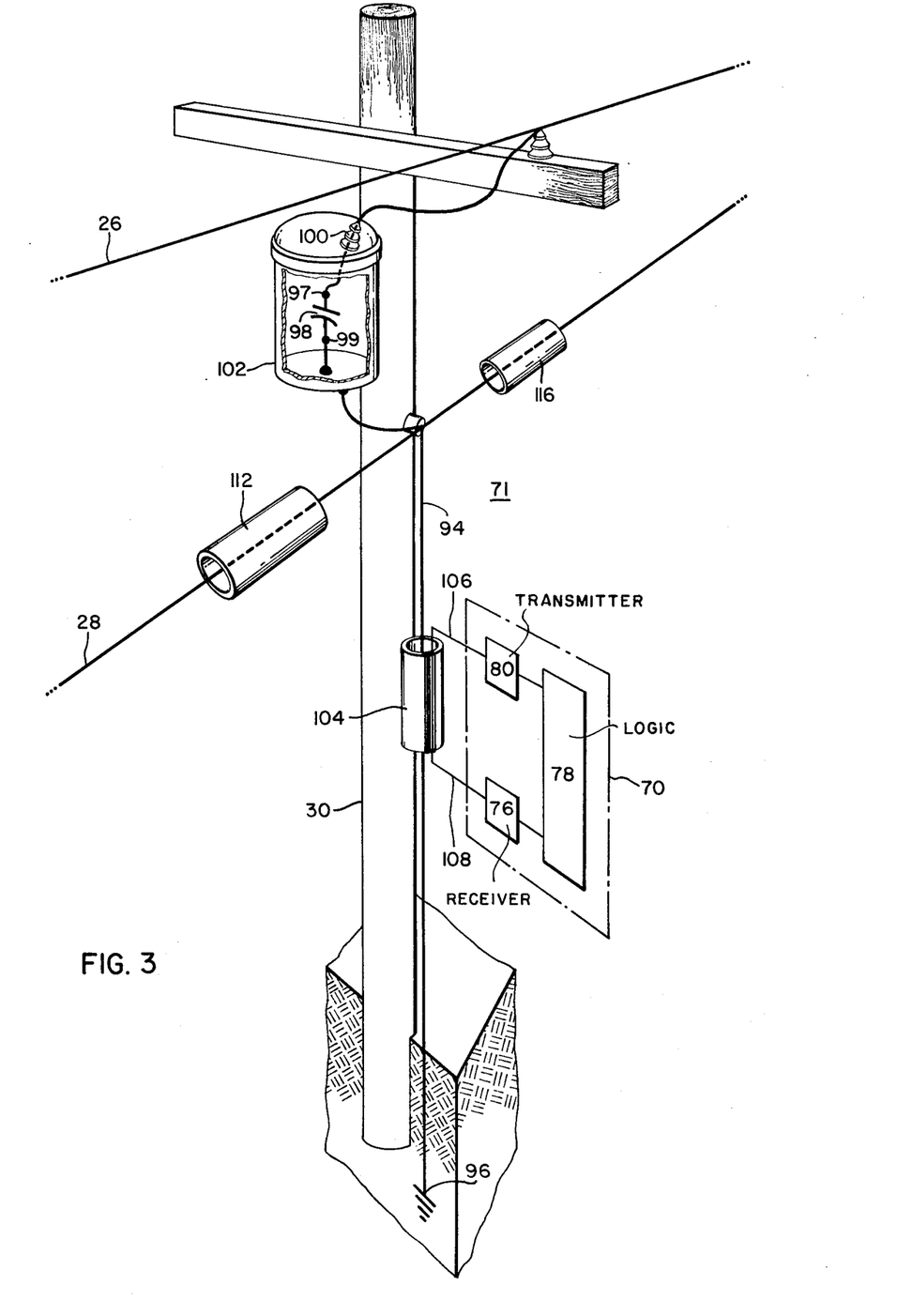
FIG. 3 is a diagrammatic and schematic view of a high voltage signal coupler constructed according to the teachings of this invention.

With this background in mind, a new high voltage signal coupler, which is the novel aspect of this invention, will now be described. There is shown in FIG. 3 a novel, high voltage signal coupler 71 which couples the repeater 70 and the primary conductor 26 together in signal communication. It should be noted that the signal coupler described below can also be used to couple the remote communication terminals to the primary conductor. The signal coupler 71 utilizes the less expensive single bushing coupling capacitor 98 wherein the high voltage terminal 97 of the capacitor 98 is connected to the primary distribution line conductor 26 through a high voltage insulating bushing 100. The low voltage terminal 99 of the capacitor 98 is connected to the capacitor case 102 which is connected to real earth ground 96 by the ground conductor 94. Also connected to the ground conductor 94 is the distribution network neutral conductor 28 which forms a continuous, grounded path between adjacent utility poles. It should be noted that the connections attending the use of the single bushing capacitor 98 in the new, high voltage, signal coupler are similar to those connections presently used by utility companies to add power factor correction capacitors to the high voltage distribution network.

In order to minimize the 60 Hz. power current drained by the coupling capacitor 98 and, at the same time, to provide efficient high frequency signal transmission, the value of capacitor 98 is chosen such that it provides a substantially high impedance to the 60 Hz. power current; while at the same time presents little or no impedance to the high frequency carrier communication signals. For example, in a 4.2 kV distribution network, a coupling capacitor 98 having a value of 0.63 μfd will draw only one ampere of current and have 4.2 K ohm reactance at 60 Hz. and 3.3 ohm reactance at a carrier signal frequency of 100 KHz. In order to couple the communication signals between the ground conductor 94 and the repeater 70, a coupling means 104 is provided. The coupling means 104, according to the preferred embodiment of this invention and known to those skilled in the art, is typically comprised of two U-shaped members constructed of powdered iron, ferrite or other magnetic material, which are placed in mating relationship around the ground conductor 94 to form a single turn, primary transformer configuration with the ground conductor 94, as shown in greater detail in FIG. 4. Several turns of a conductor are wrapped around the core 104 to form two secondary windings 106 and 108, the turns ratio of each being such that they match the impedance of receiver 76 and transmitter 80 of repeater 70, respectively. The length of the hollow magnetic core 104 is chosen so as to provide a suitable high impedance to the high frequency carrier communication signals, while at the same time not interfering with the function of the ground line conductor 94 at the 60 Hz. frequency of the power current. Furthermore, the type of material, and the dimensions of the magnetic core 104 are chosen to insure that the core 104 will not be saturated by the 60 Hz. power current flowing through the coupling capacitor 98. Since the use of hollow ferritic cores is well known in the art, the calculations required to determine the length and cross-section of the cores, necessary to provide all of the above features, will not be presented in this application. This type of magnetic core saturates at large currents, such as those associated with a lightning strike, thereby providing low inductance which allows only a small amount of voltage to be developed across the magnetic core 104 during fault current conditions.

Figure 4:
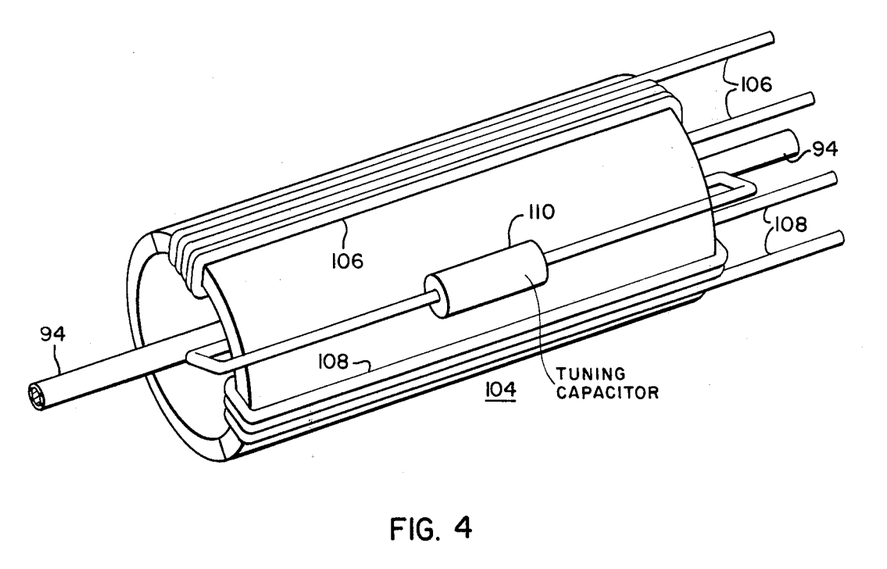
FIG. 4 is a perspective view of a magnetic core coupler shown in FIG. 3.

To insure that the magnetic core 104 efficiently couples the high frequency carrier communication signals to repeater 70 without interfering with the function of the ground line conductor 94 for the 60 Hz. power current, a tuning capacitor 110 is inductively coupled to the core 104, typically by a single turn conductor connected around core 104, as shown in FIG. 4. The value of tuning capacitor 110 is chosen so as to form a parallel resonant circuit with the magnetic core 104 at the carrier communication signal frequency. This type of circuit provides substantial impedance at its resonant frequency and low impedance at frequencies greatly different from the resonant frequency. Thus, at the carrier communication signal frequency, typically between 5 KHz. and 300 KHz, the parallel resonant circuit will present a high impedance and thereby develop the communication signal across the magnetic core 104 and tuning capacitor 110 circuit. Furthermore, the tuned parallel resonant circuit provides low impedance at the 60 Hz. frequency of the power current, thereby allowing the ground line conductor 94 to function normally with regard to the power current.

Figure 5:
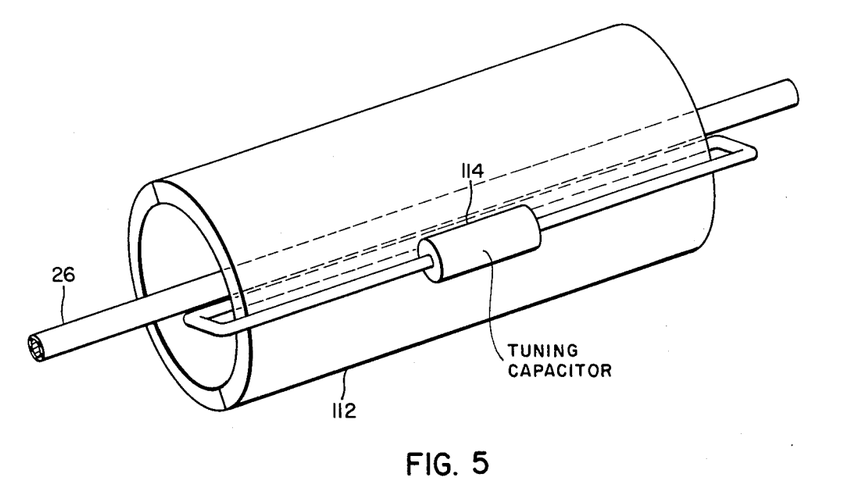
FIG. 5 is a perspective view of a magnetic core and tuning capacitor blocking device constructed according to the teachings of this invention.

As mentioned above, certain distribution networks contain a grounded pole-to-pole neutral conductor in which ground conductors connect the neutral conductor to earth ground at various points along the distribution network. Since certain of these ground conductors are utilized by the signal coupler described above, provisions must be added to prevent the carrier signals from being transmitted over the neutral conductor to adjacent ground conductors. Accordingly, additional hollow magnetic cores 112 and 116, are inductively coupled around the distribution network neutral conductor 28 to the left and right of the connection between neutral conductor 28 and the ground line conductor 94 utilized by signal coupler 71 as shown in FIG. 3. Tuning capacitors are inductively coupled to magnetic cores 112 and 116, such as capacitor 114 for core 112, as shown in FIG. 5, to form parallel resonant circuits at the carrier communication signal frequency which prevent the carrier communication signals from flowing through the neutral conductor 28 to ground conductors carried on adjacent utility poles.

In another preferred embodiment of this invention, the magnetic cores 112 and 116, shown in FIG. 3, are not required. It is well known that the impedance characteristics of transmission lines are dependent upon, among other things, the length of the line and the terminating impedance. Thus, in certain instances where the adjacent ground conductors to the left and right of a signal coupler are conveniently located at a specific distance from the ground conductor utilized by the signal coupler, the input impedance of the neutral conductor between two adjoining ground conductors is sufficient to effectively block the high frequency carrier communication signals from reaching the adjoining ground conductor. More specifically, in a situation where the length of the neutral conductor between two adjacent ground conductors is equal to one-quarter of the wavelength of the frequency of the communication signal, the input impedance of the neutral conductor will be infinite, thereby preventing the communication signal from being transmitted through the neutral conductor.

For example, assuming that the adjacent ground conductors to ground conductor 94 utilized by signal coupler 71 in FIG. 1 are conductors 16 and 95, the portion of neutral conductor 28 between conductor 94 and ground conductors 16 and 95 will present infinite imput impedance to the carrier signals when the length of neutral conductor 28 between ground conductor 94 and ground conductors 16 and 95, as shown by dimensions 122 and 124 respectively, is equal to one-quarter of the wavelength of the frequency of the carrier communication signal. This infinite impedance will prevent the carrier signals, transmitted through the coupling capacitor of signal coupler 71 to the ground line conductor 94, from being diverted to ground via ground conductors 16 and 95 which would greatly diminish the strength of the carrier signal.

It should be noted that certain distribution networks, particularly delta type networks, do not utilize a pole-to-pole-grounded neutral conductor. In these networks, wherever a ground connection is required, such as for the secondary of a distribution transformer, a ground conductor connected to earth ground is installed. When it is desired to install a signal repeater or remote communication terminal in such a distribution network, a ground conductor, similar to ground conductor 94, can be added. Since there is no connection between this ground conductor and adjacent ground conductors, blocking means, such as cores 112 and 116 are not required.

The novel high voltage signal coupler described above reduces the possibility that various portions of the circuit can rise to the potential of the primary conductor. According to this invention, the conductive housing 102 of the coupling capacitor 98 can be attached to the ground conductor 94 as required by certain electric utility companies. In addition, the use of the hollow magnetic cores, such as cores 104, 112 and 116, enables the utility lineman to easily look through each core to see that the neutral conductor and the ground conductor is continuous, and unbroken. Furthermore, if the ground conductor is accidentally disconnected from real earth ground, the low voltage terminal of the coupling capacitor will still be connected to real earth ground at the power current frequencies via the neutral conductor and ground conductors on nearby utility poles.

The novel high voltage signal coupler disclosed in this invention can be utilized to particular advantage with power factor correction capacitors. As known to those skilled in the art, capacitor banks are attached to the primary distribution conductors at certain intervals along the distribution network to improve the power factor of the distribution network. Power factor capacitors are connected between each primary conductor, such as conductor 26, and the grounded neutral conductor, such as neutral conductor 28, in much the same manner as that described above for the single bushing capacitor 98. Thus, the use of additional single bushing capacitors can be eliminated and the power factor correction capacitors utilized as signal couplers if it is convenient to place a signal repeater at the locations along the distribution network where the power factor correction capacitor banks are located.

Thus, it will be apparent to one skilled in the art, that there has been disclosed a novel high voltage signal coupler which efficiently couples high frequency carrier communication signals between the primary conductors of a distribution network and communication elements. By inductively coupling a hollow, magnetic core around a ground conductor, the novel signal coupler enables a single bushing coupling capacitor to be used, which has been heretofore impossible in certain utility company distribution networks. In certain instances, existing power factor correction capacitors can be used in place of the single bushing coupling capacitor thereby simplifying installation and reducing the need for additional equipment.

What is claimed is:

1. A signal coupler for coupling carrier communication signals at a first frequency between a primary conductor of an electrical distribution network carrying power current at a second frequency thereon and a communication element, comprising:
    a first ground conductor at ground potential with respect to said primary conductor of said distribution network;
    a first coupling means for coupling said carrier signals between said primary conductor and said first ground conductor, said first coupling means including a capacitive element having first and second terminals disposed in a housing, said first terminal being electrically insulated from said housing and connected to said primary conductor, said second terminal being connected to said housing and to said first ground conductor; and
    a second coupling means for coupling said carrier signals between said first ground conductor and said communication element, said second coupling means having primary and secondary portions, said primary portion consisting of a hollow core of magnetic material disposed in inductive relation around said first ground conductor whereby a single turn primary winding is formed, said secondary portion including a wound conductor inductively coupled to said core and connected to said communication element; said secondary portion further including an impedance element inductively coupled in parallel to said core; said impedance element having an impedance such that a parallel resonant circuit is formed at said first frequency.

2. The signal coupler of claim 1 wherein the distribution network includes a plurality of primary conductors, one of which is connected to earth ground by a plurality of first ground conductors and wherein the first coupling means couples the carrier signals between a primary conductor not connected to earth ground and one of said first ground conductors, said signal coupler further including means for blocking the carrier signals from being transmitted from said first coupling means to earth ground through said one of said primary conductors connected to earth ground and the others of first ground conductors not associated with said first coupling means.

3. The signal coupler of claim 2 wherein
    the blocking means includes first and second blocking circuits, each including a hollow core of magnetic material disposed in inductive relation around the one of the primary conductors connected to earth ground and a capacitive element inductively coupled in parallel to said core and having a predetermined impedance such that a parallel resonant circuit is formed at the first frequency of the carrier signals;

said first and second blocking circuits being disposed around said one of said primary conductors, with one on each side of the connection between said one of said primary conductors and the one of the first ground conductors associated with the first coupling means.

4. The signal coupler of claim 2 wherein the blocking means includes the first ground conductors immediately adjacent to the one of said first ground conductors associated with the first coupling means being spaced a distance equal to one-quarter of the wavelength of the first frequency of the carrier signals from said one of said first ground conductors associated with said first coupling means.

5. A signal coupler for coupling carrier communication signals at a first frequency between an electrical distribution network having at least first and second primary conductors whereon power current is transmitted at a second frequency and a communication element, comprising:
- a plurality of ground conductors each connected to real earth ground and to said second primary conductor of said distribution network;
- a capacitive element having first and second terminals disposed in a housing; said first terminal being electrically insulated from said housing and connected to said first primary conductor; said second terminal being connected to said housing and to one of said ground conductors; said capacitive element having a value which exhibits a low impedance at said first frequency of said carrier signals and a high impedance at said second frequency of said power current;
- a first transformer coupler having primary and secondary portions; said primary portion including a hollow core of magnetic material disposed in inductive relation around said ground conductor associated with said capacitive element whereby a single turn primary winding a formed; said secondary portion including wound conductors inductively coupled to said core and further coupled to said communication element in impedance matched relation; said core being further disposed in parallel relation with an impedance element having a predetermined value such that a parallel resonant circuit is formed at said first frequency of said carrier signals;
- a plurality of second transformer couplers, at least one of which is disposed in inductive relation around said second primary conductor between said ground conductor associated with said capacitive element and each adjacent ground conductor connected to said second primary conductor; each of said second transformer couplers including a hollow core of magnetic material cooperatively arranged in parallel with an impedance element having a predetermined value such that a parallel resonant circuit is formed at said first frequency.

* * * * *